United States Patent [19]

Rose

[11] Patent Number: 5,708,709
[45] Date of Patent: Jan. 13, 1998

[54] SYSTEM AND METHOD FOR MANAGING TRY-AND-BUY USAGE OF APPLICATION PROGRAMS

[75] Inventor: John R. Rose, San Jose, Calif.

[73] Assignee: Sun Microsystems, Inc., Mountain View, Calif.

[21] Appl. No.: 569,804

[22] Filed: Dec. 8, 1995

[51] Int. Cl.$^6$ .................................. H04L 9/32; H04L 9/30
[52] U.S. Cl. ........................................ 380/4; 380/9; 380/23; 380/25; 380/30; 380/49
[58] Field of Search .................... 380/4, 9, 23, 25, 380/30, 49, 50

[56] References Cited

U.S. PATENT DOCUMENTS

4,924,378  5/1990  Hershey et al. ..................... 380/4 X
5,438,508  8/1995  Wyman ............................... 380/4 X Primary Examiner—Bernarr E. Gregory
Attorney, Agent, or Firm—Gary S. Williams; Flehr Hohbach Test Albritton & Herbert

[57] ABSTRACT

A system and method for managing the distribution of licensed application programs stored on a server over a distributed computer system maintains control over the program even after the program has been distributed to a client computer from a provider on an information server. Protection may include license expiration date verification, authorized user ID verification, and protection against decompilation and reverse engineering by maintaining the program in an encrypted form until verification of the expiration date and user identity are complete and the program is ready for decoding, loading into the client computer CPU, and execution. A user identifies a program for trial use by any conventional means such as by using a network browser on the World Wide Web. The server recognizes a user request to access the application program. The server may have an agent on the client computer for performing certain predetermined administrative tasks. This agent may take the form of an application builder program module, provided by the trial application provider, which is resident on the client computer. The server (including the agent) determines whether program access conditions are satisfied, and if satisfied transmits a version of the program to the client. The transmitted file includes an encrypted portion. The server and agent also verify that the user is currently entitled to execute the application program including that the trial license has not expired at the time the user initiates execution, and generates an executable version of the application program.

15 Claims, 7 Drawing Sheets

| FIGURE 9A |
|---|
| FIGURE 9B |

SYSTEM AND METHOD FOR MANAGING TRY-AND-BUY USAGE OF APPLICATION PROGRAMS

The present invention relates to systems and methods for managing the distribution of licensed application programs and application program components, including the distribution of trial versions of applications and components that automatically expire after the expiration of predefined trial usage privileges.

BACKGROUND OF THE INVENTION

For the purposes of this document, the term "application program" is defined to include applets and other application program components. A component is an incomplete program fragment. Users can integrate application program components into a new application using an appropriate tool, such as the Application Builder of the present invention, discussed below.

A number of different "try and buy" systems for distributing application programs and other types of computer software have been used in prior art systems. The most common mechanisms for limiting the rights of the users of the trial versions of application programs are "time bombs," which disable the program after the expiration of a certain date, "usage metering" schemes which attempt to meter the number of hours of usage of the program and disable it after usage reaches a predefined limit, and various "capability limitation" schemes in which the capabilities of the trial version of the application are so limited that end users are motivated to license the standard version of the program.

While software security systems in the past have attempted to prevent program copying using a number of copy protection schemes, including requiring end users to know a password or to possess a physical token that enables use of the program, such copy protection systems have generally not been used in existing try and buy software dissemination systems. The problem is particularly acute when the program is distributed over a distributed computer system, because the program file sent to a user over a wire or other communication channel is inherently copyable.

It is a goal of the "try and buy" system and method of the present invention to prevent users from disseminating executable copies of application programs to other end users, because those other end users have not necessarily agreed to the licensing terms of the program's owner.

Another goal of the present invention is to give the owners of application programs reliable information about the parties who have requested trial use of those programs.

Another goal of the present invention is to make acquisition of limited use rights (e.g., the right to use a trial version of a program) as automatic as possible so as to make the use of trial versions of programs as easy as possible.

Another goal of the system and method of the present invention is to limit generation of an intelligible version of a file including an application program to a user only when the user is currently entitled to access the file.

A further goal of the present invention is provide a system and method for limiting the period of time and storage location during which an intelligible version of a file is available to a user.

Another goal of the system and method of the present invention is to limit generation of an executable version of an application program to a user only when the user is entitled to execute the application program at the time execution is attempted by the user.

SUMMARY OF THE INVENTION

In summary, the present invention provides a system and method for managing the distribution of licensed files including application programs over a distributed computer system that maintains control over the files even after the file has been distributed from a program provider on a server to an end user on a client computer. Protection includes license expiration date verification, authorized user verification (with or without a termination date grace period) protection, and protection against decompilation and reverse engineering by maintaining the application program file in an encrypted form until verification is complete and the program is ready for decoding and execution.

The inventive method and system for managing usage of an application program initially stored on a server coupled to a distributed computer system by a user includes recognizing a user request to access an application program, determining whether predetermined access conditions are satisfied, transmitting a version of the application program to the computer associated with the user making the request for receipt and storage only when the access conditions have been satisfied, further verifying prior to program execution that the user is currently entitled to execute that received application program, and generating an executable version of the application program from the transmitted version only if the verification is affirmative.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
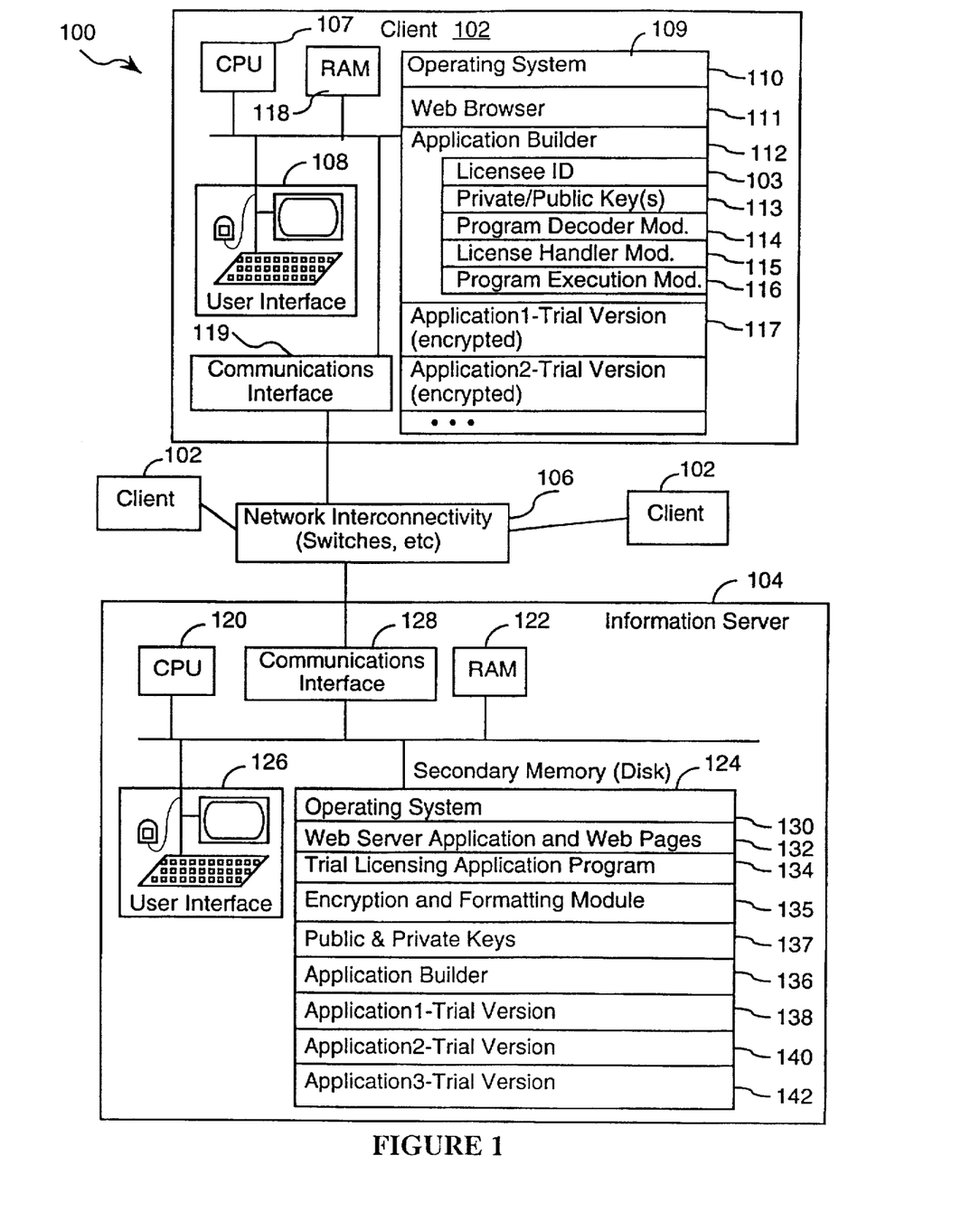
FIG. 1 is a block diagram of an embodiment of a distributed computer system incorporating the present invention.

Referring to FIG. 1, there is shown a distributed computer system 100 having many client computers 102 and at least one information server computer 104. In the preferred embodiment, each client computer 102 is connected to the information server 104 via network interconnectivity means such as the Internet 106, although other types of communication connections could be used. While most client computers are desktop computers, such as Sun workstations, IBM compatible computers and Macintosh computers, virtually any type of computer can be a client computer. One or more users (not shown) are associated with each client computer 102.

In the preferred embodiment, each client computer includes a CPU 107, a user interface 108, primary memory 118 (such as fast random access memory), user communication interface 119 for communicating with the information server computer 104 via communication network 106, and additional memory 109 for storing an operating system 110, a World Wide Web browser program 111, an Application Builder program 112, and one or more Application Programs 117. The Application Builder program 112 and Application Programs 117 contain features provided specifically by the present invention. Optionally included among these features is a client Licensee ID 103 imbedded in the Application Builder 112 and used for access verification as described in detail below. The Application Builder 112 also preferably includes a pair of public and private keys 113 that are unique to the client computer, a program decoder module 114, a license handling module 115, and a program execution module 116.

The information server 104 includes a central processing unit (CPU) 120, primary memory 122 (i.e., fast random access memory) and secondary memory 124 (typically disk storage), a user interface 126, and a communications interface 128 for communication with the client computers 102 via the communications network 106.

For the purposes of the present discussion, it will be assumed that the information server's secondary memory 124 stores: an operating system 130, a World Wide Web server application and a corresponding set of Web pages 132, a trial licensing application program 134 for handling the licensing of Application Programs to end users associated with client computers 102, a copy of the aforementioned Application Builder 136 for transmission and licensing to end users, a pair of public and private encryption keys 137 for the server, and copies of the trial versions of various Application Programs 138, 140, 142 for transmission and licensing to end users.

It is also assumed for the purposes of the present discussion that the information server 104 is a World Wide Web Server, but other information servers may alternatively be employed. The Web Server application 132 controls the server's responses to requests by client computers 102 to retrieve files using standard World Wide Web (WWW) protocols. The Web Server Application works with a set of Web source files, which are the documents and other files or objects that client computers 102 receive in response to properly formed requests. The present invention does not modify the Web Server application 132. Thus, operation of the Web Server site insofar as client computers 102 are concerned remains unchanged by the present invention.

Figure 2:
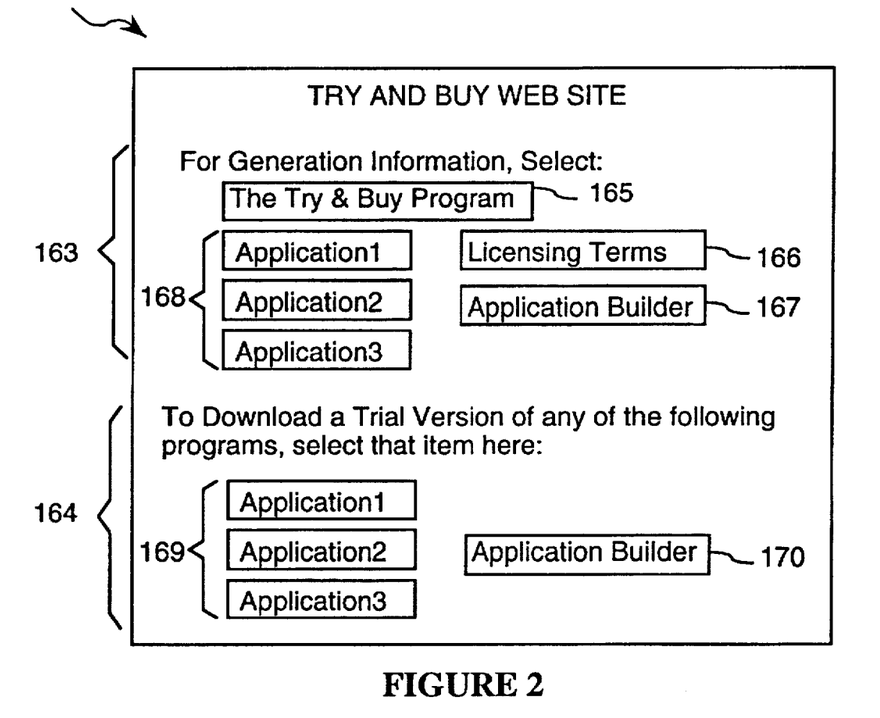
FIG. 2 is a schematic representation of an exemplary Web site page used to disseminate trial versions of programs that are available for licensing.

Referring to FIG. 2 there is shown a schematic representation of an exemplary home page 160 of the Web site (information server) 104, accessible by a user using client computer 102. The home page 160 includes a general information section 163 having menu selection buttons for obtaining information about the Try & Buy Program 165, Licensing Terms and Conditions 166, information about the Application Builder 167, and information about one or more Application Programs 168. For example, each Application Program may be described in terms of its functionality, storage requirements, minimum processor requirements for execution, monetary costs for permanent versions of the application program, and the like. Licensing terms and conditions may be Application Program specific, and further may contain provisions for specific Licensees or classes of Licensees.

The home page 160 of the Web site (information server) 104 also includes a Trial Version Program Download Selection Section 164 having a submenu 169 that includes selection buttons for each of several Application Programs as well as a button 170 for selecting the Application Builder. To download a Trial Version of any of the listed programs, the user merely selects one or more programs of interest from the menu in section 164.

Alternately, the Web page may contain specialized HTML annotations, such as Java language applets that make contact with the user's Application Builder and cause it display remotely available applications as if they were on a similar organizational footing with locally available applications.

The Application Program file is stored in one or more of several different formats depending on where in the distributed computer system 100 the file exists or is stored. There are four storage formats of particular interest:

the Server Format, which is the format of the Application Program in Secondary Memory 124 of Information Server 104 prior to selection by a particular user;

the Transmission Format, which is the format of the Application Program in storage in Secondary Memory 124 of Information Server 104 after selection by user for downloading to client computer 102, and during transmission to the user;

the Client Storage Format, which is the format of the Application Program in storage in memory 109 of the client computer 102 after the downloading is complete but prior to verification and execution (described hereinafter); and the Execution Format, which is the format of the Application Program in temporary storage in RAM 118 and/or CPU 107 during execution of the Application Program.

The differences in the formats relate generally to existence and content of ancillary file information associated with the Application Program and the user (where applicable) such as information contained in header records, and with the encrypted or decoded condition of the executable program and other fields. Each of these formats is described in greater detail below with respect to FIGS. 3–6.

For the purposes of this document, the terms "decode" and "decrypt" shall be used synonymously to refer to the process of reversing the encryption of a set of information. Similarly, the adjectives "decoded" and "decrypted" shall be used synonymously to refer to a set of unencrypted information that was generated from a corresponding set of encrypted information.

Figure 3:
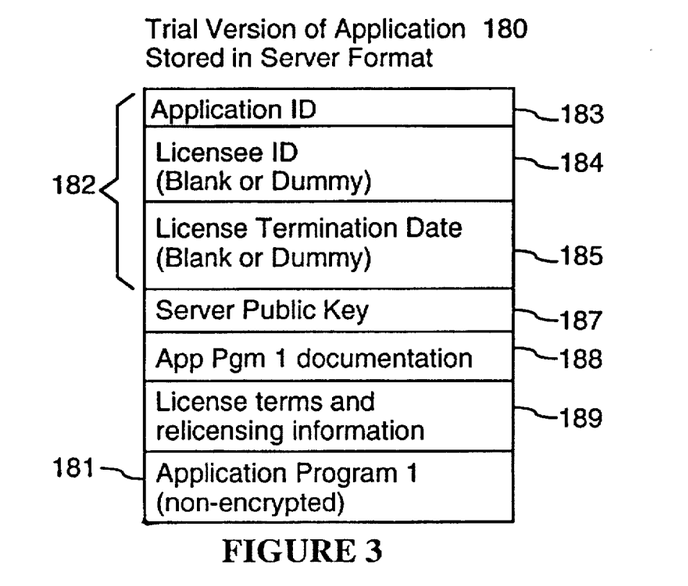
FIG. 3 is a block diagram of an exemplary header record of the stored version of the Application Program on a server in a preferred embodiment of the invention.

In reference to FIG. 3, a schematic illustration of the Server Format 180 of an Application Program trial version 138 is shown. The Server Format includes the non-encrypted application program 181, and may optionally include information fields for Application ID 183, License Termination Date 185, and Licensee ID 184. These files are optional because prior to selection by a particular user, the file is generic for all potential users and no such Information (except the Application ID) is applicable to the application program file. The particularized server format includes each of the Application ID 183, License Termination Date 185, and Licensee ID 184 fields and may either be created and stored as an actual file on the server or may exist only transiently as the generic server format is particularized to the requesting user and encrypted to generate the transmission format prior to transmission to the client computer. Note that the server formatted version of the application program could be stored in an encrypted form, but decryption followed by encryption would be required to encrypt the application program with the public key associated with the client computer Application Builder 112.

The Server Format of an application program in the preferred embodiment also includes a copy of the server's public key 187 (to be used by client computers), documentation 188 for the application program, as well as text 189 representing the trial licensing terms for the application program and relicensing terms.

Once the user has selected an Application Program for trial use the user is associated with a licensed version of the Application Builder. This Application Builder license may be preexisting or may have been allocated to the user in conjunction with selection and downloading of the trial version of an Application Program. In either situation, the Application Builder is licenced to the user and a licensee identifier is associated with that user. Server 104 includes an Encryption Module 135 that encrypts the Application Program stored in Server Format 180 based on a public key 113 associated with the user to generate a transmission format of the same Application Program.

Figure 4:
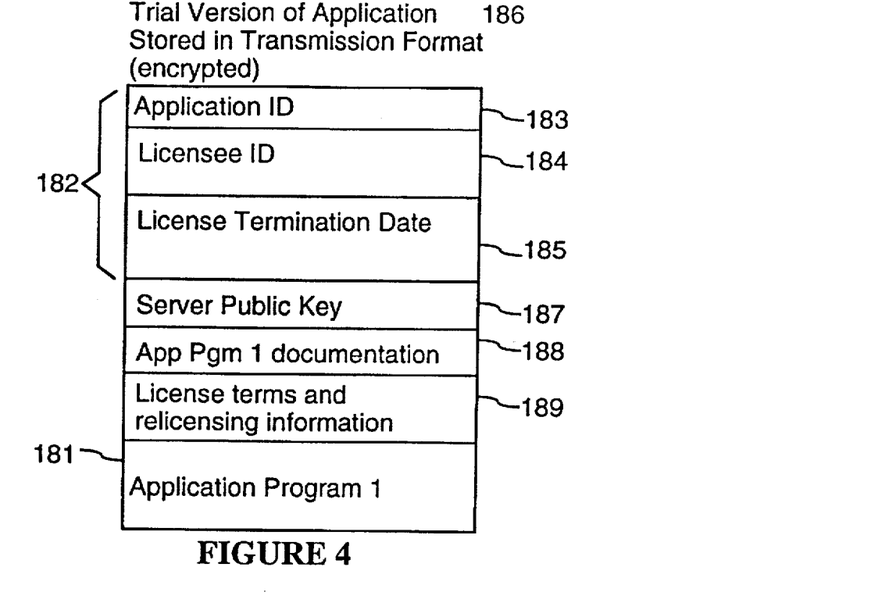
FIG. 4 is a block diagram of an exemplary header record of the transmission format of the trial version of an application program shown in FIG. 3 in a preferred embodiment of the invention.

In reference to FIG. 4, a schematic illustration of the Transmission Format 186 of an Application Program trial version 138 is shown. The transmission format includes an encrypted version of the Application Program executable code 181, an Application Program ID 183, a proper licensee ID for the particular user 184, a license termination date 185, as well as copies of the public key, documentation and license informational fields 187, 188, 189. In the preferred embodiment all fields of the Transmission Format 186 are encrypted with the user's Application Builder public key 113 to prevent eavesdropping and unauthorized copying or modification of the application program and/or control information.

Furthermore, in the preferred embodiment the control information (i.e., header fields 183-185) is first encrypted with the server's private key prior to encryption of the entire file 186 with the user's Application Builder public key. In this way double encryption is used to protect the control information. More generally, it is desirable that none of the Application Program itself, and none of the header fields 183, 184, 185, appear as clear text during transmission from server 104 to client computer 102 over the network 106.

Figure 5:
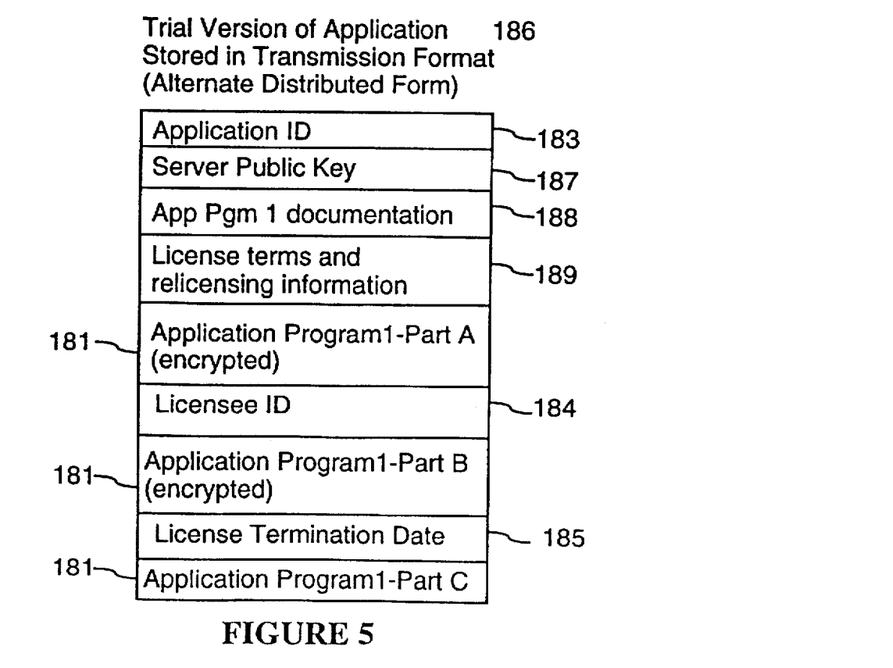
FIG. 5 is a block diagram of an alternate form of an exemplary header record of the transmission format of the trial version of an application program shown in FIG. 4 in another preferred embodiment of the invention.

While the term "header" fields or information has been applied to the identification information fields in this description, and such information fields are shown for simplicity as a plurality of contiguous records in the file (e.g. FIGS. 3, 4, and 6), it should be understood that the identification information may be placed in any predetermined location in the application program file so long as the Application Builder 112 can locate and interpret the information during the verification and decoding procedures prior to execution of the application program. For example, FIG. 5 is a block diagram showing a version of the transmission format in which the license ID 184, and License Termination Date 185 are located within the body of Application Program 1, which is split into parts A, B, and C. Such intermingling of the identification and security information within the body of the Application Program is generally applicable to all of the formats described. Placement of the identification information within the application program itself enhances security by making it extremely difficult for even an authorized user of the application to locate and alter the identification information, including the licensee ID and the license termination date.

The Client Storage Format of an application program trial version, while not shown in a separate figure, is the same as the Transmission Format 186, with a decrypted copy of the control information (header fields 183-185) "pre-pended" at the front of the file. The decrypted control information is not "trusted" by the Application Builder because it is subject to manipulation by the user, but is rather compared with the encrypted control information at execution time. In an alternate embodiment, the Client Storage Format is the same as the Transmission Format, and the control information is not stored in clear text form.

Figure 6:
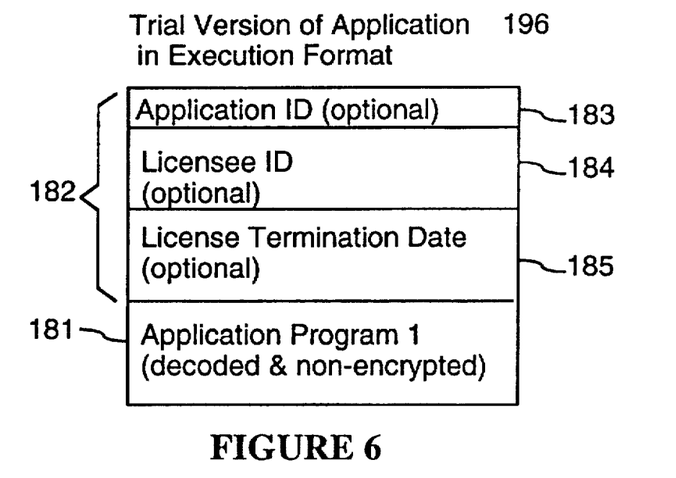
FIG. 6 is a block diagram of an exemplary header record of the execution format of the trial version of an application shown in FIG. 4 in a preferred embodiment of the invention.

In reference to FIG. 6, a schematic illustration of the Execution Format 196 of an Application Program trial version 138 is shown. The Execution Format 196 includes a decrypted and decoded version of the Application Program. It need not necessarily include application identifier 183, licenses identifier 184, or licenses termination date 185. Although such information may be carried along in the file, it does not represent executable code and serves no further security purpose after verification and decoding.

In the preferred embodiment the executable code is only available transiently during execution of the Application Program in RAM 118 or CPU 107 of the client computer. It is not stored in decrypted or decoded form on any mass storage device in a human readable form. The Execution Format of the Application Program is essentially a decrypted version of the transmission version that is generated by the Application Builder 112 on the client computer 102 after the Application Builder has verified the validity of the license for the particular user and has decoded the Application Program so that it is in the proper format for execution by the client computer 102.

Figure 7:
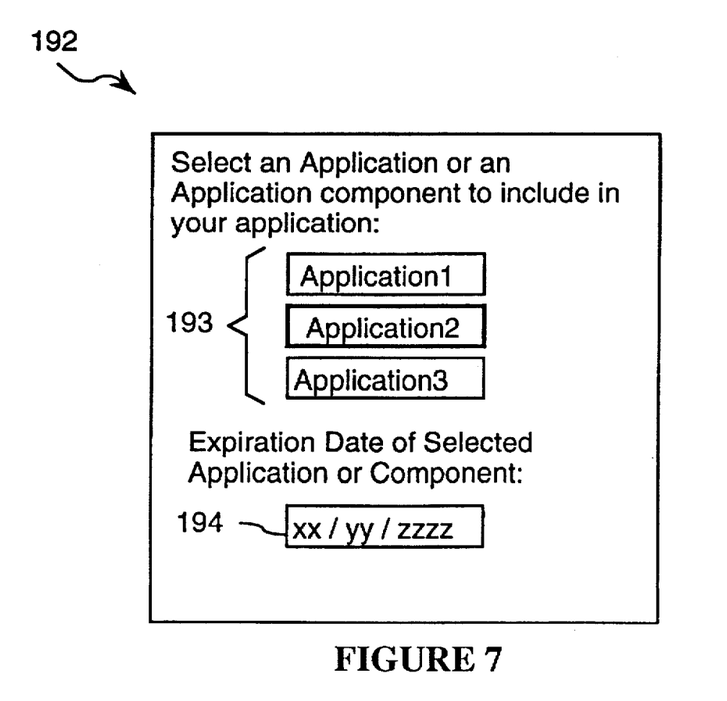
FIG. 7 is a schematic representation of a menu presented by the Application Builder for executing trial versions of Application Programs.

Referring to FIG. 7, after one or more trial Application Programs have been downloaded to and stored on client computer 102, a user associated with that client computer may decide to execute one of the Application Programs. In one embodiment of the invention, the user will be presented with a menu 192 on a display screen of user interface 108, including a list 193 of available application programs. The user may then select an Application Program, for example Application2. The client computer will respond to this selection by displaying the Expiration Date of the Selected Application 194, and may present other information pertaining to execution of the selected application. It may for example provide a description of input/output data types, file formats, related programs, and the like to assist the user in using the program. This information is found in the documentation field 188 of the stored application program. Additional menus for viewing other information, such as license terms and relicensing information (from field 189) may also be provided. These displays may be integrated by the Application Builder with similar displays for locally stored, fully licensed programs.

Figure 8:
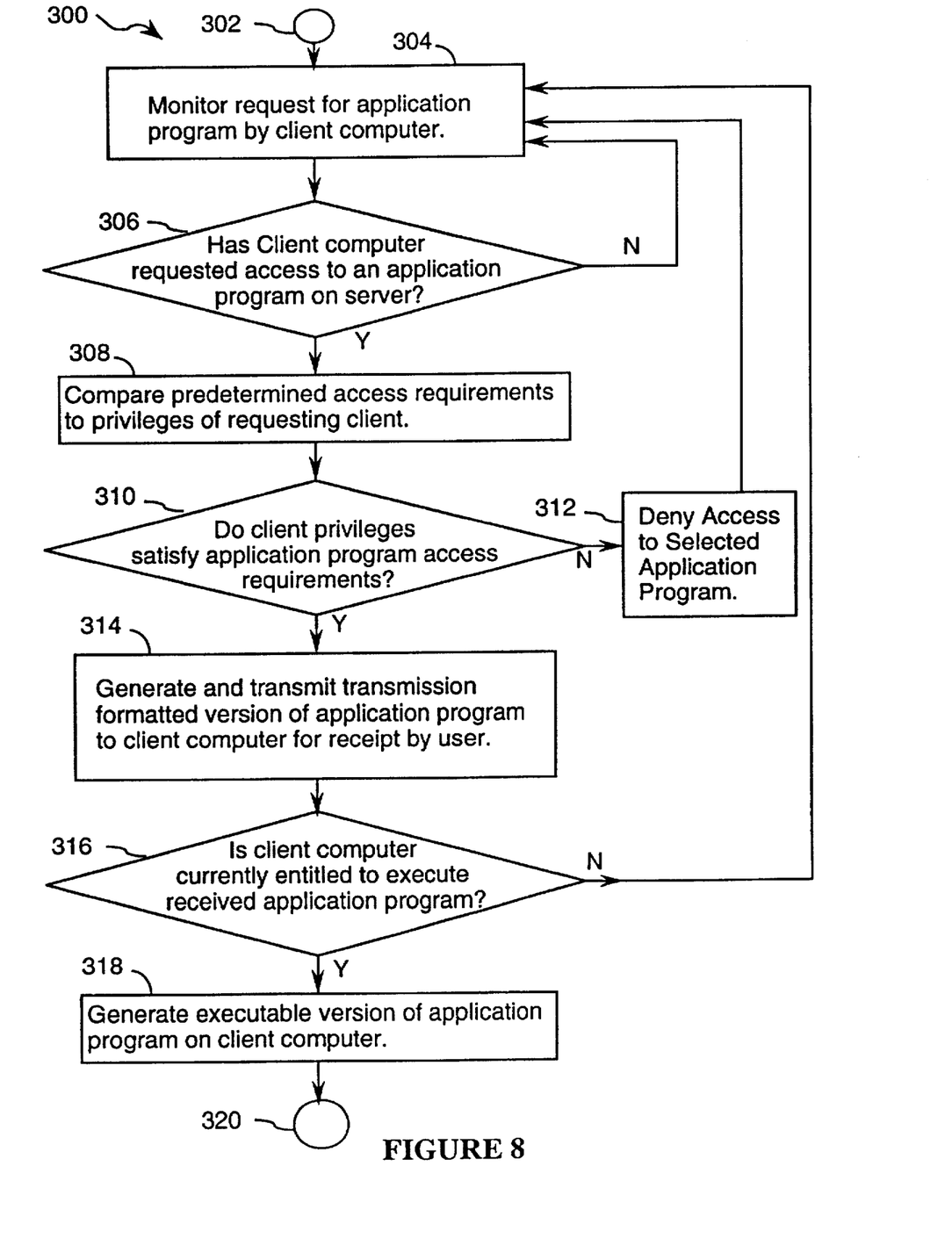
FIG. 8 is a flow chart of an embodiment of the trial application program execution method of the present invention.

Referring to FIG. 8, an embodiment of the method 300 of the present invention for managing use of an Application Program by a user on a distributed computer system 100 is shown. The Application Program is initially stored as a Server Format version 180 of the Application Program on server 104. Execution starts at Step 302 in response to a user's request for a trial version of an Application Program.

At step 304 the server 104 monitors requests for information and program access from the client computer connected to the server computer. Application Builder 112 may act as an agent for the server by initiating communication with the server in response to a request by client computer 102. At step 306 server 104 recognizes a request from a user associated with one of the client computers 102 to access the trial version of an Application Program.

Upon selecting an application program (or the Application Builder) for downloading, user will optionally be presented with a reminder that the requested program is made available to the user for trial use only under conditions of the license agreement. The terms of the license agreement are then displayed for the user's review on the display screen, and the user is prompted by the server (possibly through the Application Builder 112 acting as an agent for the server) to accept the license terms. In one embodiment of the invention, the acceptance of the license is preferably made explicitly by an affirmative action by the user before the selected application program will be downloaded. For example, the user may be requested to input a identifying name, or to retype a verification code such as the user's licensee ID for example, presented by the server for transmission to the server. Alternatively, the acceptance may be more passive, such that unless the user declines to accept the license terms, the license is accepted and file downloading commences.

At step 308, the server compares predetermined program access restrictions for the Application Program with client computer access privileges and determines whether predetermined access conditions are satisfied by the requesting client computer. At step 310, the server determines whether the client privileges satisfy Application Program access requirements. The access requirements in the preferred embodiment are (A) ownership of a valid license for the Application Builder by the user or associated client computer, (B) receipt of the user's Application Builder public encryption key from the user's Application Builder, and (C) explicit user acceptance of the licensing terms for the trial version of the selected Application Program. The information from the user will typically identify the user and the type of computer platform being used. This information about the user can be automatically provided to the owners of the requested application program, thereby providing the owners with reliable information about the parties who have requested trial use of those programs.

At Step 312, if the access conditions are not satisfied then access to the trial version of the user selected Application Program are denied (at least temporarily until access restrictions are satisfied). However, if the access conditions are satisfied (Step 314) then server 104 generates a Transmission Version of the user selected Application Program from the Server Format version on the server, and then transmits the Transmission Format version of the requested Application Program to the client computer. The Transmission Format version of the Application Program is preferably generated for a particular user and contains user identification information including a licensee identification code or number 184 as described earlier with respect to FIG. 3. Furthermore, all or a significant portion of the Application Program code is encrypted in the Transmission Format version of the Application Program. In the preferred embodiment, the Application Program is encrypted using RSA encryption programs with the user's public key being used as the encryption key. As understood by those skilled in the art, the encrypted Application Program can be decoded by corresponding RSA decoding programs with the user's private key.

The transmission formatted version is received by the client computer and is preferably stored in memory 109 in the client storage format for later execution and use.

The Application Program now resides on the client computer. While the user may choose to immediately execute the program, the user could also desire to use the program for the first time or additional times at a future date. It is therefore important to provide a mechanism for verifying that the client computer is still entitled to use the Application Program at the current or ambient date.

In Step 316 the Application Builder 112 acting as an agent for the server 104 (independent of connection between the server 104 and the client computer 102 at that time) verifies prior to execution of the program that the client computer is currently entitled to execute the Application Program. To perform this "control information" verification, the stored, doubly encrypted control information is decrypted using the Application Builder's private key 113 and the server's public key 187 (and is optionally compared with the clear text version of the control information). Using the decrypted control information, the Application Builder compares the licensee ID 184 in the Application Program with the licensee ID or IDs associated with the Application Builder, and compares the license termination date 185 in the Application Program with the current date. Only when the status of the user is verified does the Application Builder 112 decrypt the encrypted Application Program so as to prepare it for execution. The decrypted Application Program is preferably never stored in non-volatile memory of the client computer, and only exists in decrypted form during actual program execution.

It is recognized that the protection afforded by comparing a license expiration date encoded in the Application Program with the ambient computer date may in some instances be circumvented by altering the client computer ambient date; however, such alteration typically introduces sufficient other problems into system operation and file management in the user's computer that users are not inclined to use such measures. Security measures may further include other date checking procedures, such as checking file creation dates for other files on the client's computer to determine if the actual date exceeds the ambient date set for the client computer, and the like.

Figures 9, 9A:
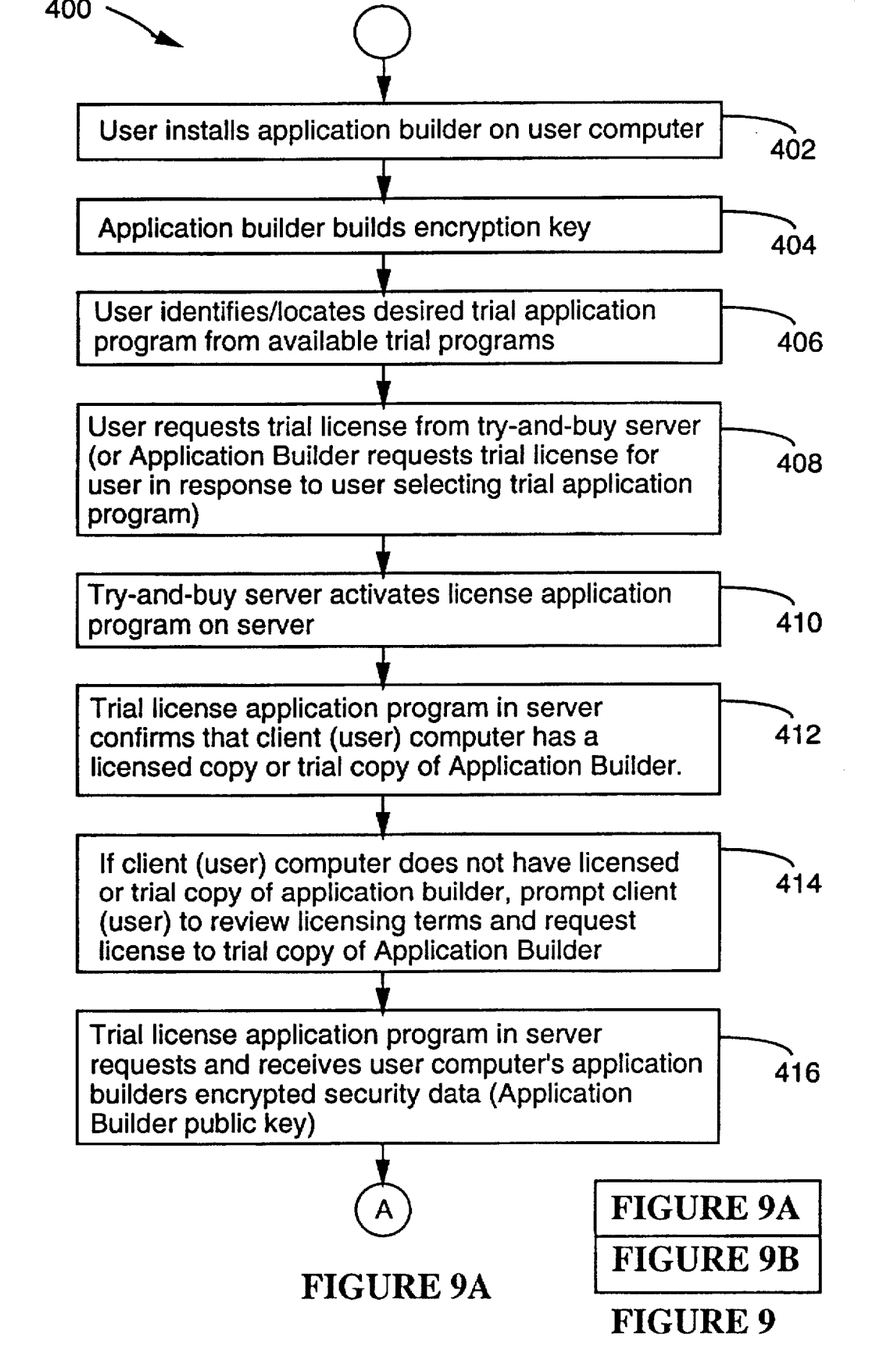
FIGS. 9, 9A, and 9B make up a flow chart of an alternative embodiment of the trial application program execution method of the present invention.
Figure 9B:
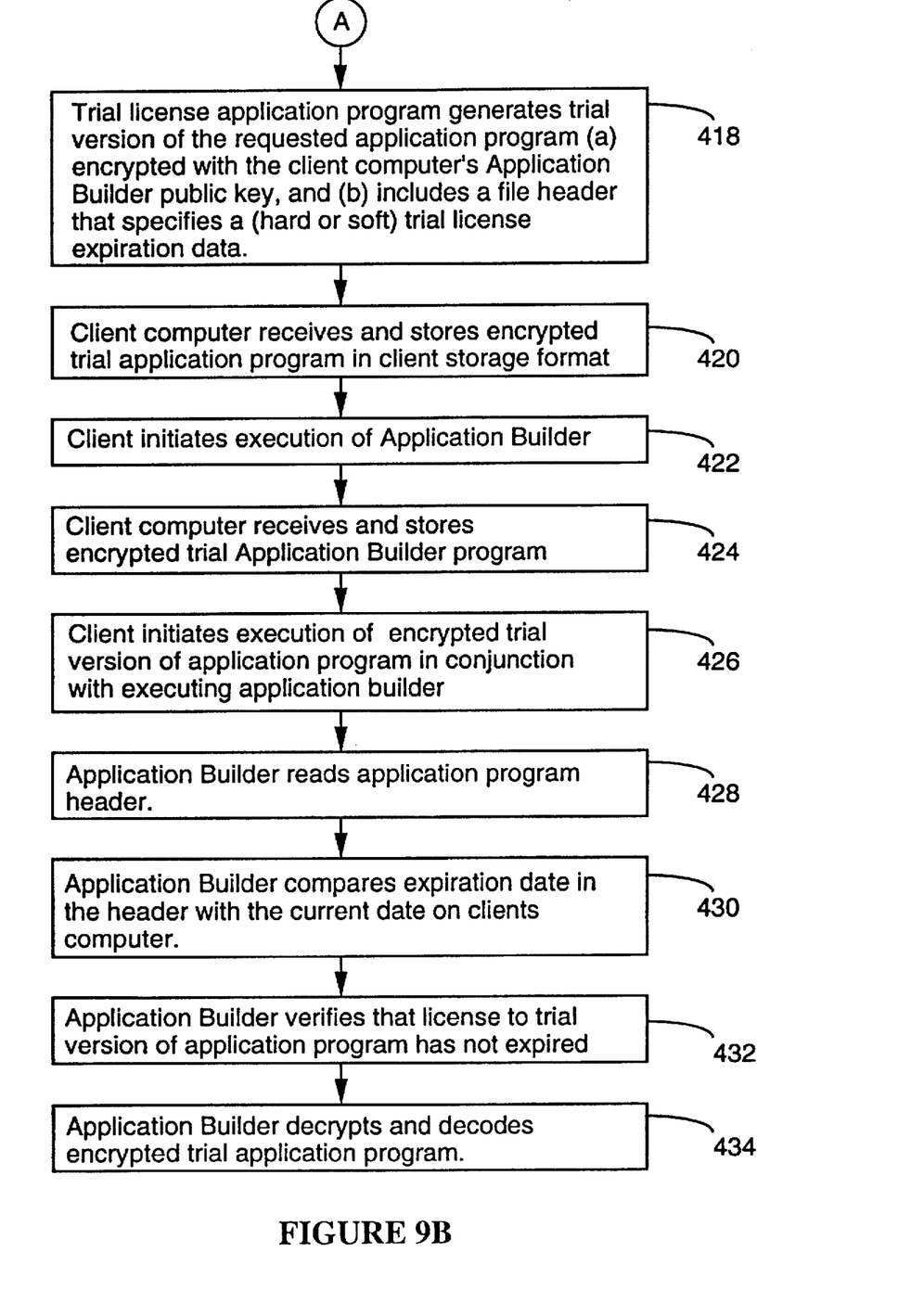

In reference to FIG. 9, a more detailed description of a preferred embodiment of the method of the present invention is now provided. The user installs an Application Builder 112 on the client computer 102 computer (Step 402). The Application Builder 112 is a program module provided by a software vendor (such as Sun Microsystems, Inc.) or in conjunction with the Application Programs made available by the provider on the server over the distributed computer system. The Application Builder acts as a local agent for the Application Program provider by performing various security check functions and program decryption functions. Application Builder 112 builds an encryption key (Step 404) after installation on client computer. In the preferred embodiment an RSA private/public key pair is generated; however, other types of encryption keys may be implemented.

The user identifies an Application Program that he or she is interested in trying out under the try-and-buy usage scheme (Step 406), such as for example by using a Web browser or the like. An exemplary Web page that would be accessed using such a Web browser is illustrated in FIG. 2 and was described above. The user locates a program that he wants to try out such as by mouse clicking on the Application Program name in the palette of submenu 169. The user may also request general information prior to selecting an Application Program, or Application Builder for downloading pertaining to the try & buy program by selecting menu item 165, on the Application Programs available by selecting one of menu items 168, on the applicable licensing terms and conditions by selecting menu item 166, or general information on the Application Builder by selecting menu item 167.

Identification of an Application Program for trial use initiates a procedure to request a trial license from the try-and-buy server 104 of the distributed computer system (Step 408). In the preferred embodiment, the Application Builder 112 acts as the user's agent in requesting the trial license for the selected try-and-buy Application Program and as the server's agent in providing the trial application and license. This activates the Trial License Application Program Module (TLAPM) 134 in the server (Step 410), which confirms that the client computer has either a valid licensed copy or valid trial copy of the Application Builder (Step 412).

If the client computer 102 associated with user does not have a validly licensed or trial copy of the Application Builder, the client is prompted to review the licensing terms and to agree to the terms presented before a trial copy of the Application Builder is generated and provided to the user (Step 414). Acceptance of the license terms by the user may be implicit in making the request for trial license, or in a preferred embodiment the user will be prompted to explicitly agree to the license terms before the Application Program (and/or Application Builder) is transmitted to the client computer, for example by making an affirmative response to an acceptance inquiry after the license terms have been presented, and before the trial-and-buy program is sent to the user's computer.

Once the TLAPM 134 in the server has confirmed that the client computer has a valid licensed copy or valid trial copy of the Application Builder, it requests and receives the user's Application Builder Public Key (Step 416).

The TLAPM 134 then generates a Transmission Format version 186 of the selected try-and-buy Application Program (Step 418). The Transmission Format version 186 is a version of the Application Program generated from the Server Format version 180 of the same Application Program that is suitable for transmission to the users computer over nonsecure transmission links of the Network interconnectivity apparatus 106. The Transmission Format version 186 (a) is encrypted with the client computer's Application Builder Public Key, and (b) optionally includes a header that specifies trial license expiration conditions, such as a trial license expiration date. The trial license expiration date may impose a hard use date limit, or may impose soft use limitations. Hard and soft use limitations are described in greater detail hereinafter.

The client computer receives the encrypted Transmission Format version of the trial Application Program and stores it locally on the computer associated with the user (Step 420). The encrypted Transmission Format version is stored in encrypted form on the client computer and is decrypted to generate a decoded version only when the application is being loaded for execution by the client computer.

The trial Application Program 117 can only be received from the server and stored on the client computer in conjunction with execution of the Application Builder 112 on the client computer. Once the Application Program is stored locally, the client computer can, at a user's request, initiate execution of the trial Application Program (Step 426). The Application Builder then verifies that the particular client computer has a valid license for that particular program and that the license to the trial Application Program has not expired.

In one embodiment of the invention, this verification includes reading the Application Program file by the Application Builder (Step 428), and then comparing the Licensee ID 184 in the file with a client ID (or a list of Client IDs) associated with the Application Builder that is licensed to the client computer (Step 430). It also includes comparing the License Termination Date 185 with the current date (i.e., the computer's ambient date) and verifying that the termination date 185 is later than the ambient date stored on the client computer (Step 432). The explicit examination of client ID may not always be necessary since the presence of a validly licensed Application Builder 112 may be sufficient security to prevent unauthorized use. The Client ID may be provided by the Application Builder 112 licensed to the client computer. Typically, possession of a valid Application Builder license may establish sufficient trust between the Application Program provider and the users associated with the client computer.

When the Application Builder has completed verification of the license, it decrypts the trial Application Program (Step 434) using the Application Builder's Private Key so that the program may be loaded for execution in the client computer CPU. As explained above, the stored, doubly encrypted control information is decrypted using the Application Builder's private key 113 and the server's public key 187 and then the decrypted control information is used to verify that user's rights to execute the trial application program.

It may be seen that in the preferred embodiment, the trial Application Program 117 must be launched while running the Application Builder 112, because the Application Builder is needed for verification of the license (Client ID matches Licensee ID and Termination date has not passed) and to decrypt the trial version of the application into executable code. All control information is verified by the Application Builder against the encrypted copy of the control information, and verification fails if there is a mismatch. Further, the trial version of the application program may include further validation steps, such as checking the validity of the Application Builder's release number in accordance with predefined confidential validity criteria.

In this manner, the time during which the Application Program exists in a human readable form is limited in time (during execution of the Application Program) and in storage location (in processor memory). Limiting the time and physical location of unencrypted program code minimizes the opportunity for unauthorized copying of unencrypted code. Even if the encrypted program were to be copied, it cannot be used without a licensed Application Builder for that client computer, because the matching Application Builder's private key, which is unique for each client computer on which it is installed, is required for decryption.

Restrictions and procedures similar to those described below for the Application Program may be applied to requesting and receiving a trial version of the Application Builder 112 so that trial versions of the applications may be obtained and executed. In the preferred embodiment trial versions of the Application Builder 112 contain a time bomb that prevents operation of the program after a threshold date has passed.

If the Application Builder in Steps 428-432 determines that the Trial License to the Application Program has expired, the action taken by the Application Builder depends on which of two alternative expiration date procedures are implemented: a hard expiration date procedure or a soft expiration date procedure.

When a hard expiration date procedure is implemented, the Application Builder causes a message to be presented to the user on the client computer that the trial version of the Application Program has expired and that the Application Program previously made available for use to the user must now be licensed with a new license. Under certain conditions, the user may be given an opportunity to obtain another trial license; however, it is anticipated that if the user is offered more than one trial license on the same Application Program, the number of such trial licensees offered may be limited to minimize possible trial use abuse. For example it is expected that where more than one trial license is offered for a single application, the total number of opportunities will be in the range of one to ten (1–10) and preferably in the range of one to three (1–3) trials.

If a soft expiration date procedure is implemented, the user is warned that the trial version of the program has expired, and that while the user can continue to use the trial version for a short period of time, by a future termination date "year/month/day" it will be necessary for the user to obtain a licensed copy of the Application Program, or a new trial version, in order for the user to be able to continue using the Application Program.

The soft expiration date version has the advantage that the provider is not put in the position of suddenly preventing use of its Application Program by the user, so that for example, the user may complete a task with ample warning. The future termination date given in the soft expiration date warning may either be a number of days in the future from the expiration date (e.g. 7 day grace period) or may be computed as a number of days forward from the ambient date on which the warning is given to the user. The later procedure has the advantage that the program will not expire without some warning to the user. Other soft termination date computation schemes may also be implemented. Particular termination procedures may be provided to different classes of users or even to particular users on the basis of the client ID associated with the Application Builder.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for managing usage of an application program by a user on a distributed computer system, said application program being initially stored as a stored version of said application program on a server coupled to said distributed computer system, said method comprising the steps of:

at said server, performing steps of:
recognizing a user request to access said application program;
determining whether predetermined access conditions are satisfied;
transmitting a transmission version of said application program to a computer associated with said user for receipt and storage only when said access conditions have been satisfied; wherein said transmission version of said application program is at least partially encrypted and is not directly executable;

at a client computer, performing steps of:
verifying prior to execution of said program that said user is currently entitled to execute said received application program; and
generating an executable version of said application program from said transmission version only if said verification is affirmative, said generating step including decrypting encrypted portions of said transmission version.

2. The method in claim 1, wherein said user request to access said application program is made using a network browser.

3. The method in claim 1, wherein said predetermined conditions comprise ownership of a valid license to an application builder module which performs said verifying and generating steps.

4. The method in claim 1, wherein said determining step includes:
providing said user with an opportunity to satisfy and accept said predetermined but as yet unsatisfied access conditions; and
recognizing explicit acceptance of said access conditions by said user.

5. The method in claim 4, wherein providing an opportunity to accept a trial license for said application program.

6. The method in claim 1, wherein said transmission version of said application program is encrypted with a public key associated with said user, and wherein said decryption is performed with a corresponding private key.

7. The method in claim 6, wherein said user associated public key and corresponding private keys are generated by said application builder module.

8. The method in claim 1, wherein said step of verifying that said user is entitled to execute said program includes verifying that a usage expiration date has not expired.

9. The method in claim 1, wherein said verifying and generation steps are performed when said user requests execution of said application program.

10. A program usage management system for managing usage of an application program by a user associated with a client computer on a distributed computer network, said system comprising:

a server coupled to said distributed computer system and having memory storage for storing said application program;

a controller coupled to said client computer for recognizing a user request to access said application program and for determining whether predetermined program access conditions associated with said application program are satisfied by said client computer;

a program file formatter for generating a transmission version of said program file that incorporates identification information associated with said client and a version of said application program that is at least partially encrypted, said program file formatter responsive to said controller to generate said transmission version only when said access conditions are satisfied;

a transmitter for transmitting said transmission version of said application program to said client computer associated with said user for receipt and storage only when said access conditions have been satisfied;

a license verifier for verifying prior to execution of said application program by said client computer that the user associated with said client computer is currently entitled to execute said application program; and a program decoder coupled to said client computer for generating a decrypted machine executable version of said application program from said transmission version of said application program only if said license verifier verifies that the user associated with said client computer is currently entitled to execute said application program, said program decoder including instructions for decrypting encrypted portions of said transmission version.

11. The system in claim 10, wherein said controller includes an application builder program module installed and executing on said client computer, said application builder program module includes said license verifier and said program decoder.

12. The system in claim 11, wherein said predetermined program access conditions associated with said application program include receipt of an encryption key from a valid copy of said application builder program on said client computer.

13. The system in claim 11, wherein said transmission version of said application program is at least partially encrypted with a public key associated with said user, and wherein said program decoder decrypts said transmission version of said application program with a corresponding private key, and said user associated public key and corresponding private key are generated by said application builder module.

14. The system in claim 10, wherein said license verification means for verifying includes means for verifying a usage expiration date associated with said application program has not expired.

15. The system in claim 10, wherein said transmission version of said application program is at least partially encrypted with a public key associated with said user, and wherein said program decoder decrypts said transmission version of said application program with a corresponding private key.

* * * * *